June 4, 1957   R. R. BURKHALTER ET AL   2,794,693
BEARING RETAINER
Filed April 5, 1954

INVENTORS
ROBERT R. BURKHALTER
PHILIP J. MAZZIOTTI
By Lawrence C. Witker
ATTORNEY

# United States Patent Office 2,794,693
Patented June 4, 1957

2,794,693

BEARING RETAINER

Robert R. Burkhalter and Philip J. Mazziotti, Toledo, Ohio, assignors to Dana Corporation, Toledo, Ohio, a corporation of Virginia Application April 5, 1954, Serial No. 420,868

9 Claims. (Cl. 308—212)

This invention relates to novel bearing assemblies, and more particularly to needle bearing retainers of the type employed in universal joints, and the like.

The primary object of the invention is to provide a roller retainer in the form of a Belleville spring washer having an annularly lipped inner edge, the washer being capable of easy assembly into a bearing race to a fixed position with relation to the rollers, and which, because of its diaphragming action, results in a more secure attachment than normally obtained with a press-fit, for example.

Figure 1:
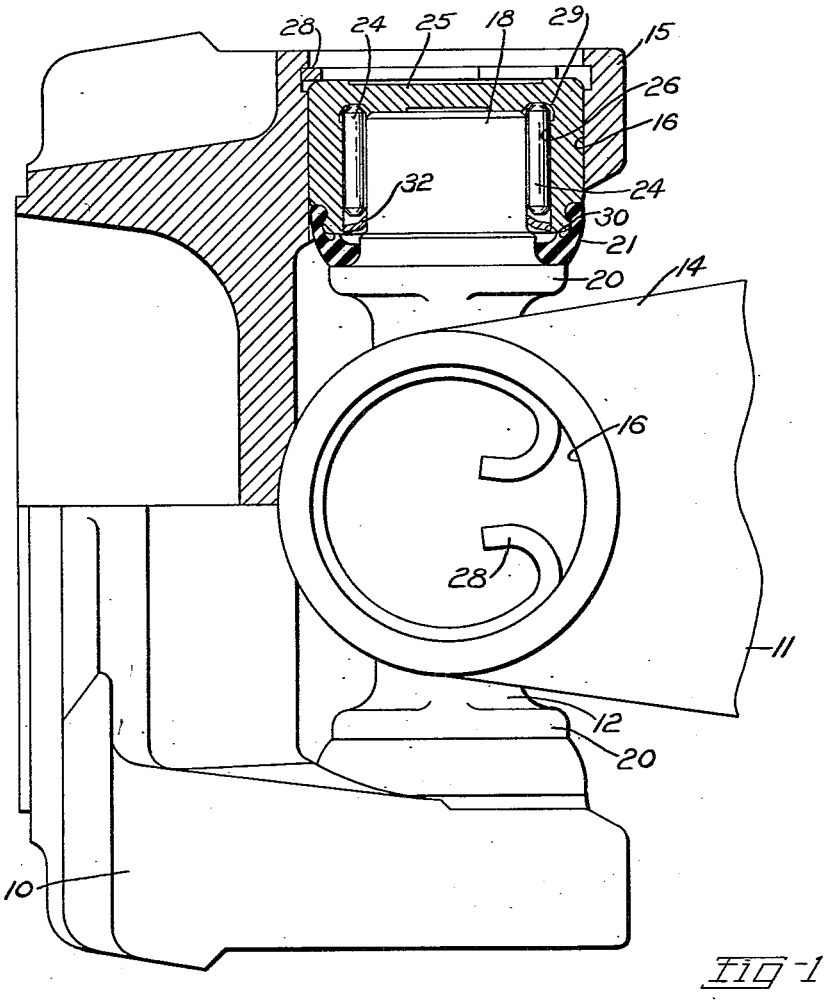
Figure 2:
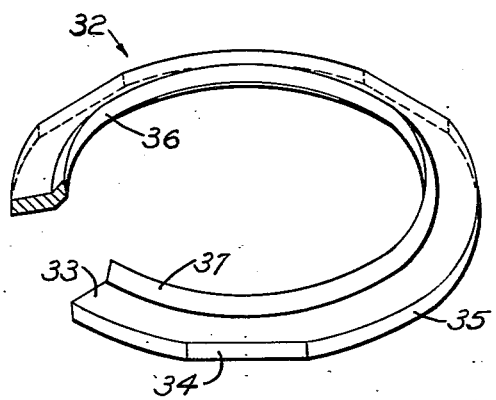

Further objects and advantages will become apparent from a study of the following description when taken in connection with the accompanying drawings in which:

Figure 1 is a fragmentary side elevation of a universal joint embodying the invention, taken partly in section to illustrate the novel bearing retainer; and Figure 2 is a perspective view of the needle retainer shown in Figure 1, with a portion removed to illustrate the cross sectional detail.

Referring to Figure 1 of the drawings, the universal joint there shown comprises a pair of yoke members 10 and 11 and a spider or cross 12. For the purpose of illustrating the present invention, a joint of a type employed in connection with a drive shaft of a motor vehicle is shown. However, it is to be understood that the invention is not to be limited to that specific type of joint nor to the specific application of the novel bearing roller retainer to such a joint.

Each yoke member 10 and 11 has formed therewith a pair of spaced arms 14 and 15 respectively, and each arm is provided with an aperture such as aperture 16 in arm 15. The apertures in the spaced arms of each yoke being disposed in axial alignment with one another.

The spider 12 serves to connected the spaced yoke arms in relatively movable relation, and is preferably of cross shape having four trunnions thereon, such as trunnion 18. Trunnions 18 are separated from the main body of spider 12 by a shoulder 20 which serves as a support for a lubricant seal 21.

The aligned apertures in the spaced yoke arms are provided with bearing assemblies within which the corresponding aligned trunnions are arranged to oscillate.

Aperture 16 is of such size that when trunnion 18 is inserted or accommodated therein defines an annular space therearound. Within this space, and disposed adjacent to and in an annular relation to trunnion 18 is an annulus or sleeve of individual bearing rollers or needles 24 of cylindrical shape.

The needle annulus is surrounded by a cup-shaped member or race 25, having an inner cylindrical surface 26 which contacts the needles 24 and serves as an outer race therefor. When assembled as shown, bearing race 25 is held in place by means such as the snap ring 28. Cup 25 is formed with an annular recess 29 to receive the upper ends of needles 24.

The inner surface 26 of the race 25 extends uninterruptedly to the lower end 30 thereof to receive a needle retainer 32. Retainer 32 is of a size to fit snugly within the open end of the race 25, and has the characteristics of a Belleville spring washer, in that its diaphragming action results in a comparatively easy, secure attachment requiring nearly twice the force to remove the retainer than is required to assemble it. Further, retainer 32 is made from spring steel which results in a hardened abutment for the needles, it is economical to produce and requires less space than conventional designs heretofore used.

The retainer 32 differs from the commonly known Belleville spring in that the body portion 33 is provided with spaced flats 34 on its outer periphery or edge 35, while the inner periphery or edge 36 is turned out or flanged to provide an annular lip 37. The flats 34 are provided in the retainer to relieve oil pressure in the assembled bearing and trunnion, which eliminates a machining operation on the journal cross 12. The lip 37 is provided so that in assembled relation a groove is formed which together with groove 29 in the cup maintains the needles loosely in position. The angularity of the retainer in assembled relation further allows for the variations in roller or needle length thus permitting larger manufacturing tolerances. For the same reason, it will be noted that the edges 35 and 36 of the retainer 32 are substantially parallel, which arrangement also permits easier assembly by aiding the diaphragming action above described.

From the foregoing, it will be noted that the retainer herein provided is capable of efficiently locating rollers or needles in a bearing race and that the same is devoid of many of the faults heretofore present in such devices. Primarily, larger manufacturing tolerance variations can be used with this type of construction which greatly reduces the cost of the complete assembly.

What is claimed is:

1. A bearing assembly comprising a cup-shaped race, a plurality of independently movable cylindrical needles arranged within said race to form a bearing sleeve; and a spring steel needle retainer fitted snugly within the open end of said race, said retainer being annular and having a flat on its outer periphery.

2. A bearing assembly comprising a cup-shaped race; a plurality of independently movable cylindrical needles arranged within said race to form a bearing sleeve; and a needle retainer fitted snugly within the open end of said race, said retainer comprising a Belleville spring washer having an inwardly extending annular roller retaining shoulder.

3. A bearing assembly comprising a cup-shaped race; a plurality of independently movable cylindrical needles arranged within said race to form a bearing sleeve; and a needle retainer fitted snugly within the open end of said race, said retainer comprising a Belleville spring washer, and having an oil pressure relief flat in its outer edge.

4. A bearing assembly comprising a cup-shaped race having an inner bearing surface; a plurality of independently movable cylindrical needles arranged within said race to form a bearing sleeve; and a needle retainer fitted snugly within the open end of said race, said retainer comprising a Belleville spring washer having its inner edge formed into an annular lip, said lip and the inner bearing surface of said race cooperating to form an annular groove for the ends of the needles.

5. A bearing assembly comprising a cup-shaped race, a plurality of independently movable cylindrical needles arranged within said race to form a bearing sleeve; and a needle retainer fitted snugly within the open end of said race, said retainer being of spring steel capable of diaphragming action whereby it is self-retained in said race.

6. A bearing assembly comprising a cup-shaped race; a plurality of independently movable cylindrical needles arranged within said race to form a bearing sleeve; and a needle retainer fitted snugly within the open end of said race, said retainer comprising a Belleville spring washer.

7. A bearing assembly comprising a cup-shaped race; a plurality of independently movable cylindrical needles arranged within said race to form a bearing sleeve; and a needle retainer fitted snugly within the open end of said race, said retainer comprising a Belleville spring washer, and having an oil pressure relief flat in its outer edge and an inwardly extending roller retaining shoulder defining its inner edge.

8. A bearing assembly comprising a cup-shaped race having an inner bearing surface; a plurality of independently movable cylindrical needles arranged within said race to form a bearing sleeve; and a needle retainer fitted snugly within the open end of said race, said retainer comprising a Belleville spring washer, said washer having its inner edge formed into an annular lip, said lip and the inner bearing surface of said race cooperating to form an annular groove for the ends of the needles, and having its outer edge formed with flats, said flats providing relief for oil pressure in said assembly.

9. A bearing assembly comprising a cup-shaped race having an uninterrupted inner bearing surface at the open end thereof; a plurality of independently movable cylindrical rollers arranged within said race to form a bearing sleeve; and a roller retainer fitted without obstruction into the open end of said race, said retainer being of spring steel capable of diaphragming action upon assembly with said race, and said retainer being located on said bearing surface solely by said diaphragming action.

References Cited in the file of this patent

UNITED STATES PATENTS

| | | |
|---|---|---|
| 1,786,926 | Wells | Dec. 30, 1930 |
| 2,078,739 | Slaght | Apr. 27, 1937 |
| 2,190,041 | Padgett | Feb. 13, 1940 |

FOREIGN PATENTS

| | | |
|---|---|---|
| 648,807 | Great Britain | Jan. 10, 1951 |